(12) United States Patent
Wang et al.

(10) Patent No.: US 7,623,973 B1
(45) Date of Patent: Nov. 24, 2009

(54) METHODS AND SYSTEMS TO PREDICT FATIGUE LIFE IN ALUMINUM CASTINGS

(75) Inventors: Qigui Wang, Rochester Hills, MI (US); Peggy E. Jones, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/114,875

(22) Filed: May 5, 2008

(51) Int. Cl.
*G01B 3/44* (2006.01)
*G06F 7/60* (2006.01)

(52) U.S. Cl. .................... 702/34; 702/185; 703/2
(58) Field of Classification Search ............ 702/34, 702/127, 185, 182; 703/2, 6, 7, 808
See application file for complete search history.

(56) References Cited

U.S. PATENT DOCUMENTS

| | | | |
|---|---|---|---|
| 6,912,913 B2 | 7/2005 | Murakami | |
| 7,016,825 B1 | 3/2006 | Tryon, III | |
| 2008/0015827 A1* | 1/2008 | Tryon et al. | 703/2 |

OTHER PUBLICATIONS

Valerie Chavez-Demoulin et al., Extreme Value Theory Can Save Your Neck, Jan. 8, 2004, pp. 1-5.

* cited by examiner

*Primary Examiner*—John H Le
(74) *Attorney, Agent, or Firm*—Dinsmore & Shohl LLP

(57) ABSTRACT

Methods and systems of predicting fatigue life in aluminum castings that combines extreme values of both casting flaws and microstructures with multiscale life models. The multiscale life models account for differing fatigue crack initiation based on the size scale of the defect and microstructure features, including provisions for generally millimeter scale casting flaws, generally micrometer scale second phase particles by cracking or debonding, or submicrometer scale dislocation interactions with precipitates which form persistent slip bands. In the presence of casting flaws, the fatigue initiation life is negligible and the total fatigue life is spent in propagation of a fatigue crack from such flaws. In the absence of casting flaws, however, the total fatigue life is spent in both crack initiation and propagation, except for the case where fatigue cracks initiate from large second phase particles in a coarse microstructure.

20 Claims, 14 Drawing Sheets

METHODS AND SYSTEMS TO PREDICT FATIGUE LIFE IN ALUMINUM CASTINGS

BACKGROUND OF THE INVENTION

The present invention relates generally to methods and systems of predicting fatigue life in aluminum castings, and more particularly to predicting fatigue life of a cast aluminum object by combining extreme value statistics and multiscale fatigue life models with casting flaw and microstructural constituent types, sizes and shapes.

Improved fuel efficiency is an important goal in automotive design. One way to help achieve this goal is through the use of lightweight materials in the construction of vehicle component parts, including in the powertrain and related componentry. In addition to making such components lighter, it is desirable to keep their cost of production low, through the use of casting and related scalable processes. For example, aluminum based materials and related methods of casting may be employed where heretofore heavy materials (typically, steel or other iron based alloys) have been used.

Nevertheless, care must be taken when casting certain lightweight materials, as such materials may be susceptible to failure by fatigue, where component failure proceeds over various stages, starting with microcrack incubation, small and long crack propagation leading to either a leak (in the case of containment vessels), final overload, or other loss of function. It is accordingly desirable that methods and systems be developed to accurately predict fatigue properties of these castings early in the component and manufacturing process design cycle. There are two fatigue design philosophies for structural components—infinite life and damage tolerant design. Infinite life design does not allow crack initiation and propagation under service loading, while damage tolerant design assumes the presence of casting imperfections, and permits crack propagation. For aluminum shape castings, the presence of casting flaws and discontinuities is almost inevitable. Furthermore, below the gigacycle life regime, there is no apparent fatigue endurance limit for cast aluminum alloys. Therefore, the damage tolerant design approach, which may produce more structurally efficient designs than the infinite life approach, is appropriate for fatigue loaded aluminum shape castings.

Fatigue properties of cast aluminum components are strongly dependent upon flaws, such as voids and related porosity, or the formation of oxide films or the like, that are produced during casting. In fact, the maximum flaw size has been recognized as the most important parameter in determining the fatigue properties of aluminum shape castings, where generally the larger the maximum flaw size, the lower the fatigue strength for a given fatigue life. In damage tolerant designs, the crack propagation life is estimated from the flaw propagation rate and initial flaw size. In this regard, an example of such fatigue life estimates can be found in a publication by the present inventors entitled *Fatigue Life Prediction in Aluminum Shape Castings* that was published as part of *Simulation of Aluminum Shape Casting Processing: From Alloy Design to Mechanical Properties* by The Minerals, Metals & Materials Society in 2006, the contents of which are herein incorporated by reference. In the publication, the present inventors noted that fatigue properties in the presence of casting flaws can be predicted based only on crack propagation, such that crack initiation can be ignored. They also noted that a significant problem with predicting fatigue properties in such a case is defining a starting flaw size.

The present inventors recognize that the lack of a computational tool that takes into consideration different classes or scales of flaw sizes in conjunction with statistical approaches is a limitation on the ability to accurately predict the fatigue properties of castings. As such, there remains a desire for a method and system to predict the fatigue life of aluminum cast components based on accurate assessments of the various flaws over multiple size scales (due to, for example, pores, voids, oxide films or the like), microstructural constituents (for example, second phase particles and aluminum dendritic structures) and submicron scale precipitate structures.

BRIEF SUMMARY OF THE INVENTION

These desires are met by the present invention, wherein improved methods and systems for predicting fatigue life in aluminum castings are disclosed. Such methods and systems combine extreme value statistics (EVS) to predict a maximum casting flaw size, in conjunction with multiscale life (also called multiscale fatigue (MSF)) models, to more accurately estimate fatigue properties of the casting. The present inventors have discovered that fatigue predictions that vary depending on the scale or size regime of the flaw (defect) lead to more accurate forecasts of fatigue properties in cast components than if such different scales are not taken into consideration. In this way, the relatively large scale of the aforementioned flaws can be modelled differently than situations dominated by second phase particles and related microstructural constituents (such as dendrite arm spacing and the cracking or debonding of intermetallic and silicon particles), or the even smaller regimes associated with dislocations interacting with precipitates to form persistent slip bands. Accordingly, the present invention allows prediction of fatigue cracks that emanate from these multiscale initiation sites, which are generally in the millimeter range (for porosity, voids, oxide films or related flaw types), micrometer range (for cracking or debonding of second phase particle types), or submicron range (for dislocations interacting with precipitates to form persistent slip band types).

Furthermore, the present inventors have discovered that the application of EVS to such MSF life models can be used to improve fatigue predictions by incorporating corresponding values from available two dimensional metallographic and fractographic data or three dimensional information taken from nondestructive testing techniques, computer simulation or both.

In accordance with a first aspect of the present invention, a method of predicting fatigue life in an aluminum casting is disclosed. Such prediction is based on the determination (through, for example, direct measurement or analytical prediction) or assumption of one or more fatigue crack initiation sites present in the casting. To achieve this, the method includes using EVS to estimate an upper bound initiation site size and type expected to occur at a particular location within the casting, then calculating the fatigue life using MSF equations that are tailored to the predominant crack initiation regime at that location.

Optionally, such regimes may be dictated by the nature of the fatigue crack initiation sites. For example, the method may include determining whether at least a portion of the casting (for example, a specific volume element in the casting) includes one of casting flaws, the secondary dendrite arm spacing (SDAS) at that location, and whether cracking or debonding of second phase particles or persistent slip bands in the submicrometer range are expected to form in service. The SDAS is a particularly appropriate representation in situations where the aluminum based casting is a hypoeutectic aluminum-silicon (Al—Si) alloy. As stated above, when casting flaws (for example, porosity, voids, oxide films or the like)

are present, such presence typically predominates fatigue life calculations. When such flaws are not present, the cracking or debonding of second phase particles predominates in fatigue life calculations, and when neither flaws nor cracking or debonding of second phase particles are present or anticipated, the fatigue life calculations predominantly depend upon the formation of persistent slip bands through interaction of dislocations with submicron microstructural constituents. This hierarchical prediction approach allows the appropriate choice of a fatigue life predicting equation to be based on the type and scale of the predominant fatigue crack initiation site. As used in the present context, the term "scale" represents the idea of size (including size relative to a matrix mean free path), and as such comports with the concept that the fatigue initiation sites are multiscale. In the particular case of aluminum based alloys (such the aforementioned hypoeutectic Al—Si alloy), the choice of which of the multiscale fatigue equations is selected is based upon a predominant form of the upper bound initiation site and the mean free path through the aluminum matrix.

Within the range of fatigue crack initiation sites where flaws have been determined to be present, the choice of the appropriate equation is further dependent upon whether the flaws are large or small, where the boundary (also referred to as a critical size or critical crack size) between large and small is the size at which the crack growth mechanism changes between short and long crack growth, where the former grows very fast at a small stress intensity range parameter ($\Delta K$) at which a long crack normally does not grow. As stated above, the critical size to distinguish between small and long crack behavior can be determined for a particular alloy and microstructure by estimating a boundary as a function of at least one of a long crack growth threshold, fatigue strength and geometric factor. One way to define the critical crack size ($a_o$) is to estimate the boundary between short and long crack behavior as a function of the long crack growth threshold, the fatigue strength, and a geometric factor to account for the particular specimen configuration. This method is discussed by El Haddad, M. H., Smith, K. N, and Topper, T. H. in "Fatigue Crack Propagation of Short Cracks", Journal of Engineering Materials and Technology, Vol. 101, 1979, pp. 42-46. EVS is useful in that it allows a measurement over a discreet portion (for example, at the granular level) of the whole to be used as a representative sample size which can be extended over a larger surface area or volume. It will be appreciated by those skilled in the art that the probability of having a casting flaw (such as porosity or oxides) in a given portion of the casting depends on many factors.

Within the range of fatigue crack initiation sites where no flaws are present (i.e., the MSF values are not dominated by flaws or related casting defects), the method proceeds to determine whether cracking or debonding of second phase particles is expected. One item of particular interest in determining whether such initiation sites are anticipated is the use of the mean free path through the aluminum matrix, such as SDAS in the hypoeutectic aluminum alloys; if SDAS in the specific volume element is larger than about 50 μm in a modified eutectic alloy or larger than about 30 μm in the case of an unmodified alloy, then there is a likelihood that second phase particle cracking or debonding in response to service loads will be the dominant fatigue crack initiation mechanism. A eutectic alloy is one where, in any given portion of the aluminum casting, eutectic silicon particles are always present. The sizes of aluminum dendrites (using SDAS as a measure) and second phase particles mainly depend on how fast that portion of the casting cooled during solidification. In hypoeutectic aluminum-silicon based cast aluminum alloys, the plate-like silicon particles form through a eutectic phase reaction during solidification. In the absence of casting imperfections, the large plate-like silicon particles determine the ductility of the material. Eutectic modifiers such as sodium or strontium can be added to alter the morphology of eutectic silicon particles from large plate-like shapes to fine fibrous shapes. This change in shape usually improves the ductility. A microstructure is considered to be coarse when, in the absence of larger scale casting imperfections, the fracture initiation and early propagation is transgranular, such that the fatigue response is controlled by non-defect crack nucleation. In hypoeutectic aluminum-silicon alloys, transgranular fracture initiation is observed when the mean free path through the aluminum matrix, such as the SDAS, is larger than about 50 μm in the modified eutectic alloy or 30 μm in the unmodified alloy. Contrarily, the microstructure is considered fine when the mean free path through the aluminum matrix, such as SDAS in hypoeutectic aluminum-silicon alloys, is smaller than about 50 μm in the eutectic modified alloy or 30 μm in the unmodified alloy. In microstructures defined as "fine" by these criteria, the fracture initiation and early propagation is intergranular. In either case, when such is determined, the method further includes determining whether particle cracking or debonding is expected in response to the service loads. If so, then an appropriate equation is selected with which to calculate fatigue life. Likewise, if it is determined that the mean free path through the aluminum matrix, such as SDAS in hypoeutectic aluminum-silicon alloys, is smaller than the respective one of the 50 μm and 30 μm thresholds discussed above, then separate equations are used to determine the fatigue life when there is cracking or debonding in the particles followed by intergranular crack propagation.

Within the range of fatigue crack initiation sites where no flaws are present and neither cracking nor debonding of second phase particles is anticipated, the method proceeds to determine the mean free path through the aluminum matrix that bounds the formation of persistent slip bands, then calculates the fatigue life based on one of two other equations applicable to crack initiation by persistent slip band formation. In the case of hypoeutectic aluminum-silicon alloys, the SDAS can be compared to the aforementioned about 50 μm and about 30 μm thresholds, to select the appropriate fatigue life calculation equation. All of the equations over all of the aforementioned scales are discussed in more detail below, and all include the use of various constants, while other variables, including stress amplitude, yield strength, maximum total strain during loading cycle, equivalent initial crack-like defect size, equivalent initial crack-like second phase particle size, equivalent dendrite cell size, local equivalent plastic strain and equivalent grain size are also used in some or all of the equations.

In accordance with a second aspect of the present invention, an article of manufacture useable to predict fatigue life in aluminum castings is disclosed. The article of manufacture comprises a computer usable medium having computer executable instructions adapted to such fatigue life predictions. The computer executable instructions comprise equations used to determine fatigue life properties based upon various constants, input conditions and nature of a fatigue-inducing condition. Such fatigue-inducing condition may include one or more of casting flaws, second phase particles and persistent slip bands, all as discussed in conjunction with the previous aspect. Within a realm dictated by casting flaws, different calculations can be made based on, for example, if an equivalent defect size of the casting flaw is above or below a critical size. Within a realm dictated by second phase particles, distinctions between coarse and fine microstructures can be used to select an appropriate calculation. Within a realm dictated by persistent slip bands, the distinction between fine and coarse microstructures can also be used to determine which equation should be used to calculate fatigue life.

In accordance with a third aspect of the present invention, a machine for predicting fatigue life in aluminum castings is disclosed. The machine includes a computing device such as discussed in the previous aspect, and may additionally include sample sensing equipment examples of which may include fatigue measuring components, as well as components capable of inducing and measuring tension, compression, impact and hardness properties of various structural materials under precisely controlled conditions. Such equipment (many examples of which are commercially available) may be operatively coupled to the computing device such that sensed data taken from the equipment can be operated upon by computer readable software to, among other things, calculate fatigue properties of the sampled casting. In other forms, the sample sensing equipment may be a sensor configured to identify casting flaws, second phase particles, persistent slip bands or the like. Such equipment may operate using machine vision or any other method known to those skilled in the art to detect such defects.

BRIEF DESCRIPTION OF THE SEVERAL VIEWS OF THE DRAWINGS

The following detailed description of the present invention can be best understood when read in conjunction with the following figures.

DETAILED DESCRIPTION OF THE PREFERRED EMBODIMENTS

Multiscale Life Models

Figure 1A:
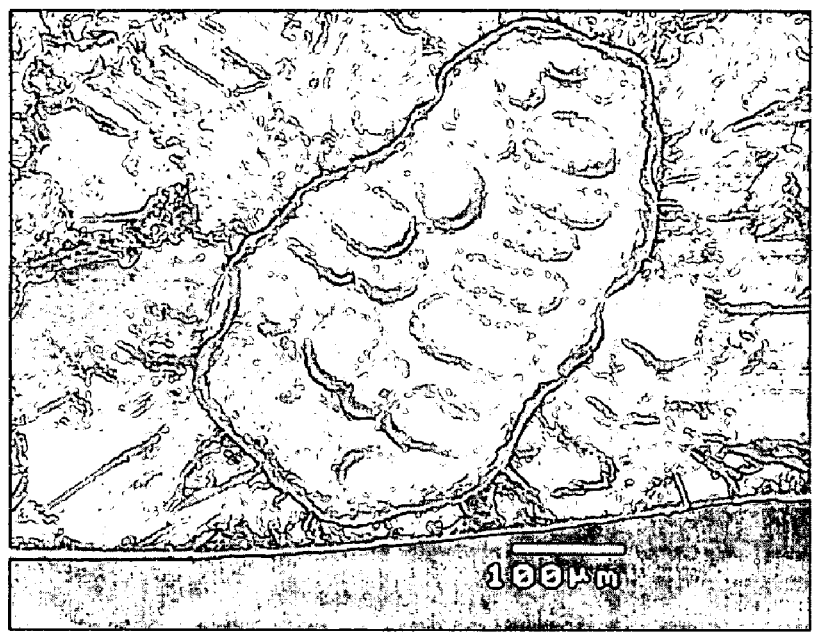
FIGS. 1A and 1B show magnified images of fatigue crack initiation sites due to porosity and an oxide film, respectively.
Figure 1B:
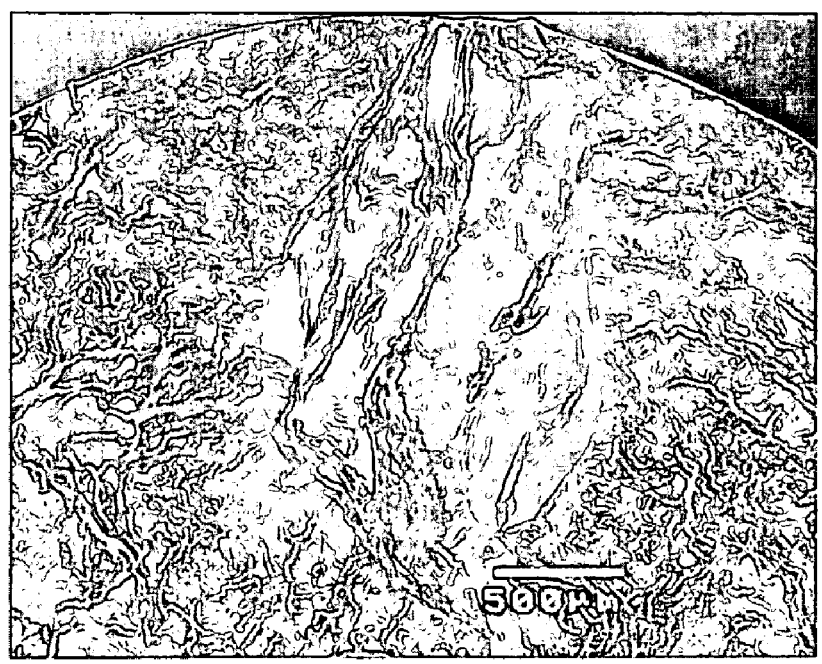
Figure 1C:
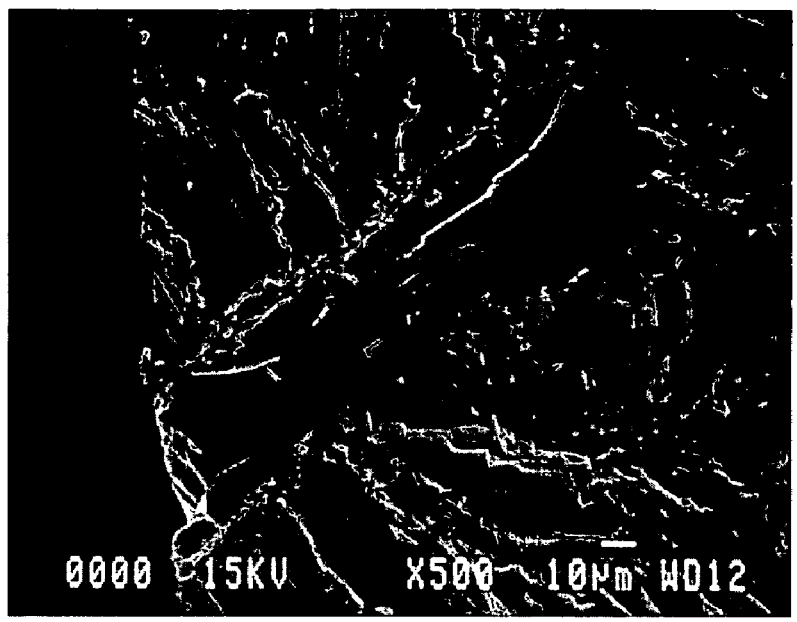
FIGS. 1C and 1D show magnified images of fatigue crack initiation sites due to large and small particle cracking or debonding, respectively.
Figure 1D:
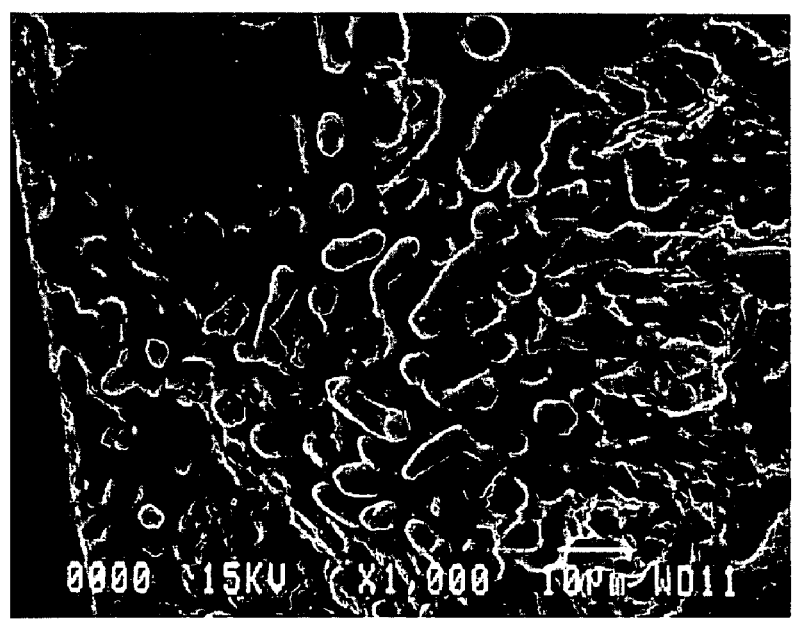
Figure 1E:
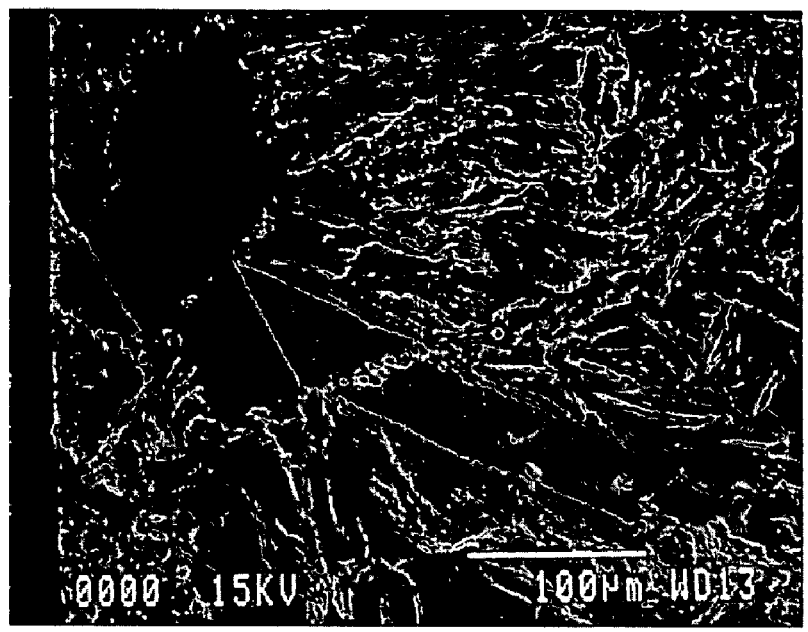
FIGS. 1E and 1F show magnified images of fatigue crack initiation sites due to persistent slip bands at two different degrees of magnification.
Figure 1F:
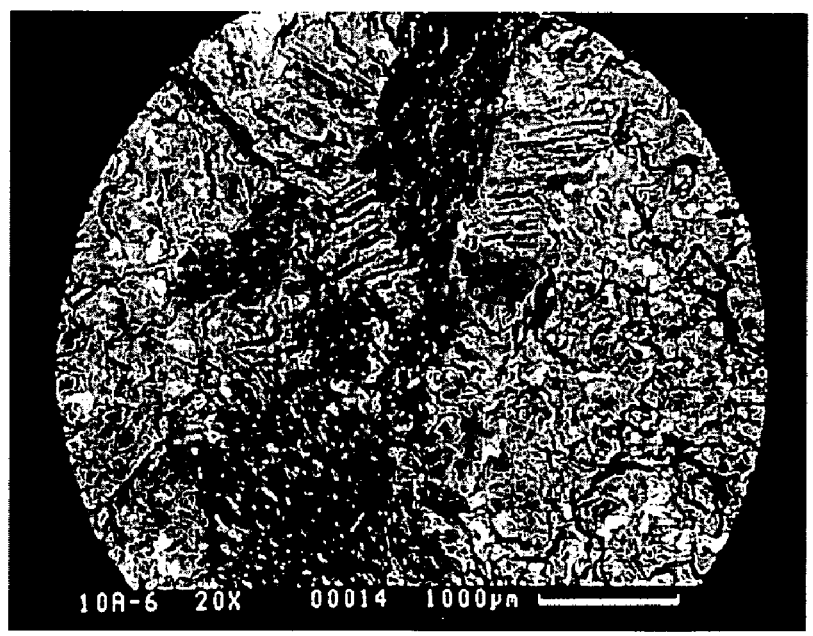

Referring initially to FIGS. 1A through 1F, magnified photos of the various fatigue crack initiation sites are shown. The probability of having a casting flaw (such as porosity or oxides) in a given portion of the casting depends on many factors. Likewise, in any given portion of an aluminum casting, the aluminum matrix and second phase particles are always present. However, the mean free path through the aluminum matrix (using SDAS as a measure of mean free path in hypoeutectic Al—Si alloys) and scale of the second phase particles mainly depend on how fast that portion of casting cooled during solidification. As discussed above, MSF modeling involves determining fatigue properties of castings having, or assumed to have, numerous crack initiator sizes, including those of relatively large (i.e., millimeter) scale flaws, medium (i.e., micrometer) scale secondary phase particles and their cracking or debonding, and generally small (i.e., submicron) scale interactions between dislocations and precipitates to form persistent slip bands, although FIG. 1F shows that the size of persistent slip bands can vary significantly, including up to a generally macroscopic scale. It is well known that fatigue cracks initiate at the largest "weak link" feature in the volume of material exposed to cyclic stress. Therefore when choosing the scale of fatigue crack initiator candidates, the upper bound of the available population should be considered. This is accomplished by estimating the upper bound using various EVS methods, or by directly measuring crack initiation sites which are themselves representative of the upper bound of the available population in a given volume. Applying MSF in conjunction with EVS allows more accurate modeling of the various defect sizes. FIGS. 1A and 1B show with particularity porosity and oxide layer formation phenomena associated with the large scale crack initiator sites, while FIGS. 1C and 1D show with particularity particle cracking or debonding phenomena associated with both large and small SDAS microstructures within the realm of medium scale crack initiator sites, and FIGS. 1E and 1F showing with particularity persistent slip band formation associated with the small scale crack initiator sites.

Figure 2:
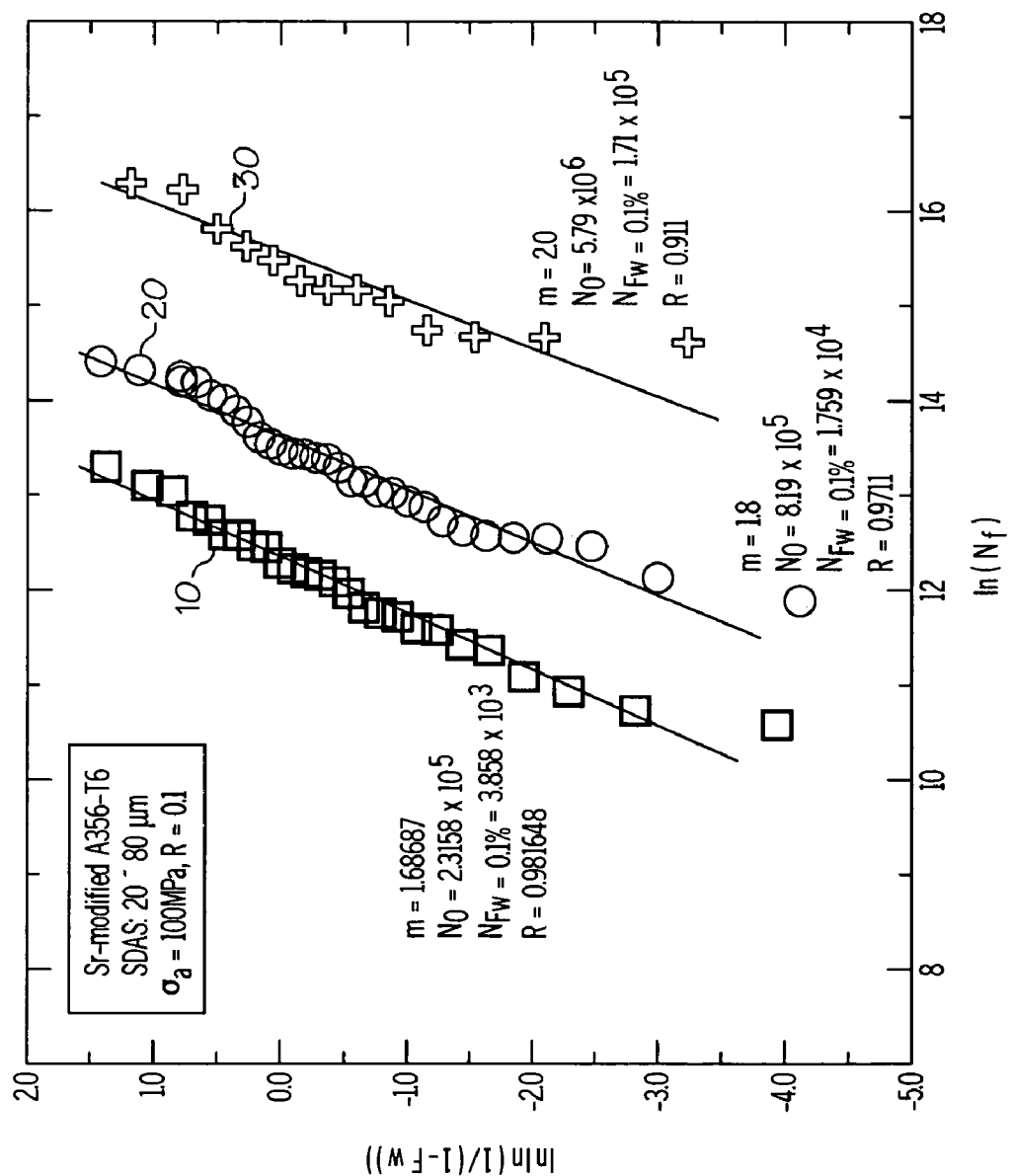
FIG. 2 shows the influence of three different scales of flaws and microstructural constituents on fatigue life for a cast A356 sample.

Referring next to FIG. 2, a chart showing the significantly different degrees of influence that the various large 10, medium 20 and small 30 scale crack initiator sites have on fatigue life reveals that the large scale 10 sites (for example, porosity, represented by the squares) are the most important factor. It also shows that in situations where a cast material is pore-free, that the other large scale (oxides) or the medium scale 20 effects (represented by the circles) may dominate. Lastly, if neither the large nor medium scale effects are present, the small scale 30 effects (such as persistent slip bands, as represented by the crosses) dominate fatigue life. In the figure, m is a Weibull modulus used to determine the scatter of the data, $N_o$ is the characteristic fatigue life at which 63% of specimens have failed, while $N_{FW=0.1\%}$ is a number of cycles at a failure probability (in Weibull statistics) of 0.1%.

Figure 3:
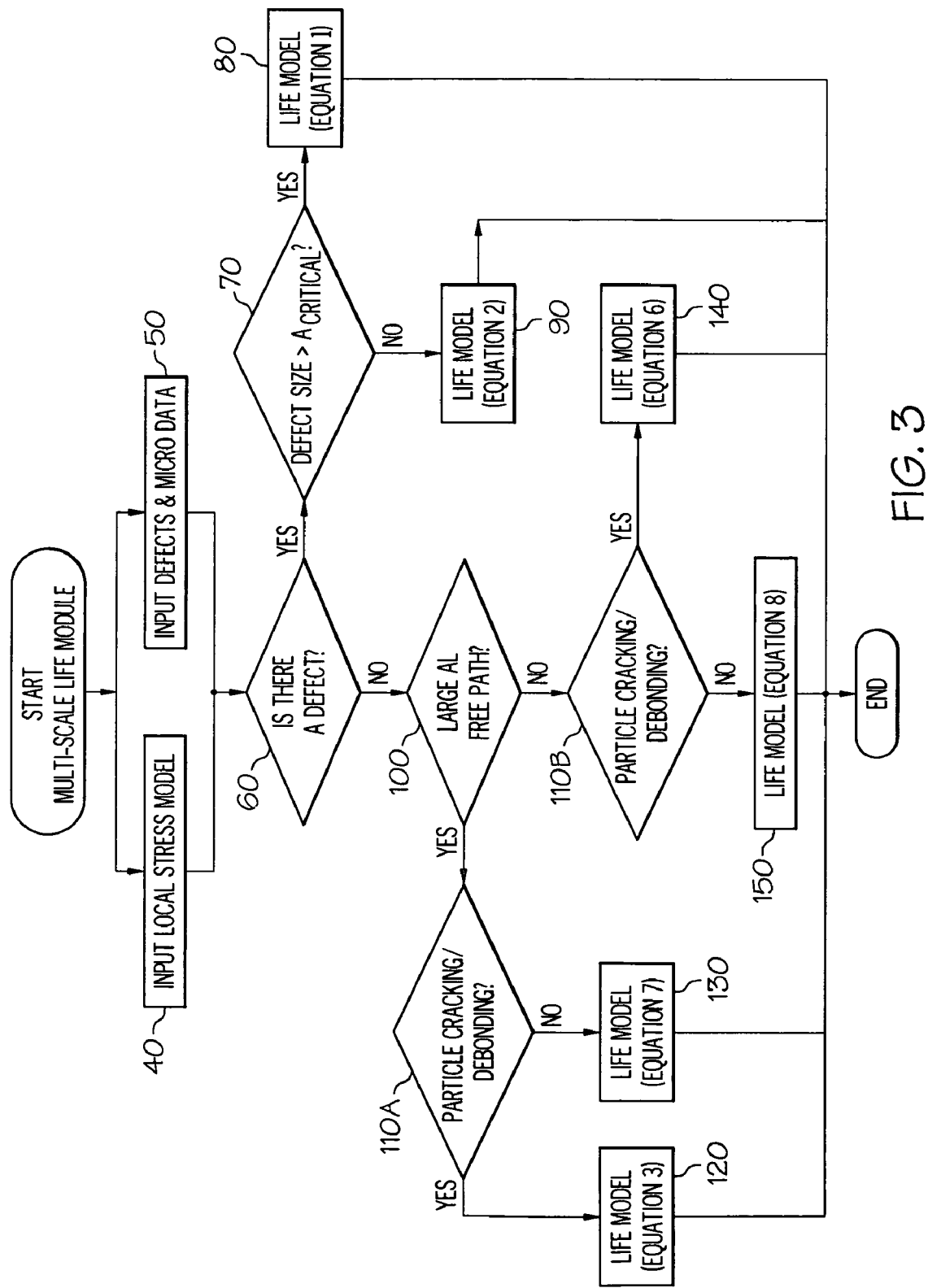
FIG. 3 shows a flow chart of how the various equations (1) through (3) and (6) through (8) discussed below are used to calculate fatigue life of a cast aluminum component.

Referring next to FIG. 3, a flowchart shows an algorithm where the various calculations are performed based on the scale of the fatigue crack initiation sites of a cast sample. To run the calculations, characterizations of the imposed stress 40 and microstructural scale and defects 50 are first input. Once this is received, the algorithm determines if casting defects (i.e., large scale initiation sites) are present in the sample 60; if so, the defect size relative to an initial crack like defect or flaw size is determined 70. If the defect size exceeds a predetermined critical dimension, a life is determined at a calculation point 80 using equation (1) discussed below. If the defect size does not exceed a predetermined critical dimension, a life is determined at a calculation point 90 using equation (2) discussed below. In response to the decision point where determination of casting defect in the sample 60 answers in the negative, the algorithm proceeds to determine 100 whether the mean free path within the aluminum matrix is large or small, either with or without particle cracking or debonding. In situations where a large mean free path of aluminum matrix (for example, greater than about 50 μm in a eutectic modified hypoeutectic aluminum-silicon alloy or greater than about 30 μm in the case of an unmodified alloy) is present, a determination 110A is then made regarding the occurrence of one or both of particle cracking and debonding. If such cracking, debonding or both, are anticipated or present, then a fatigue life is determined 120 using equation (3) discussed below. If no such cracking or debonding is anticipated or present, then a life is determined 130 using equation (7) discussed below. Going back to where the algorithm determines whether the mean free path of aluminum matrix is large or small, if the mean free path of aluminum matrix is small (for example, less than about 50 um in a eutectic modified hypoeutectic aluminum-silicon alloy or less than about 30 um in the case of an unmodified alloy), then a determination 110B is then made regarding the presence of one or both of particle cracking and debonding in a manner generally similar to that of determination 110A. If such cracking, debonding or both, are anticipated, then a fatigue life is determined 140 using equation (6) discussed below. If no such cracking or debonding is anticipated, then a fatigue life is determined 150 using equation (8) discussed below.

Figure 4A:
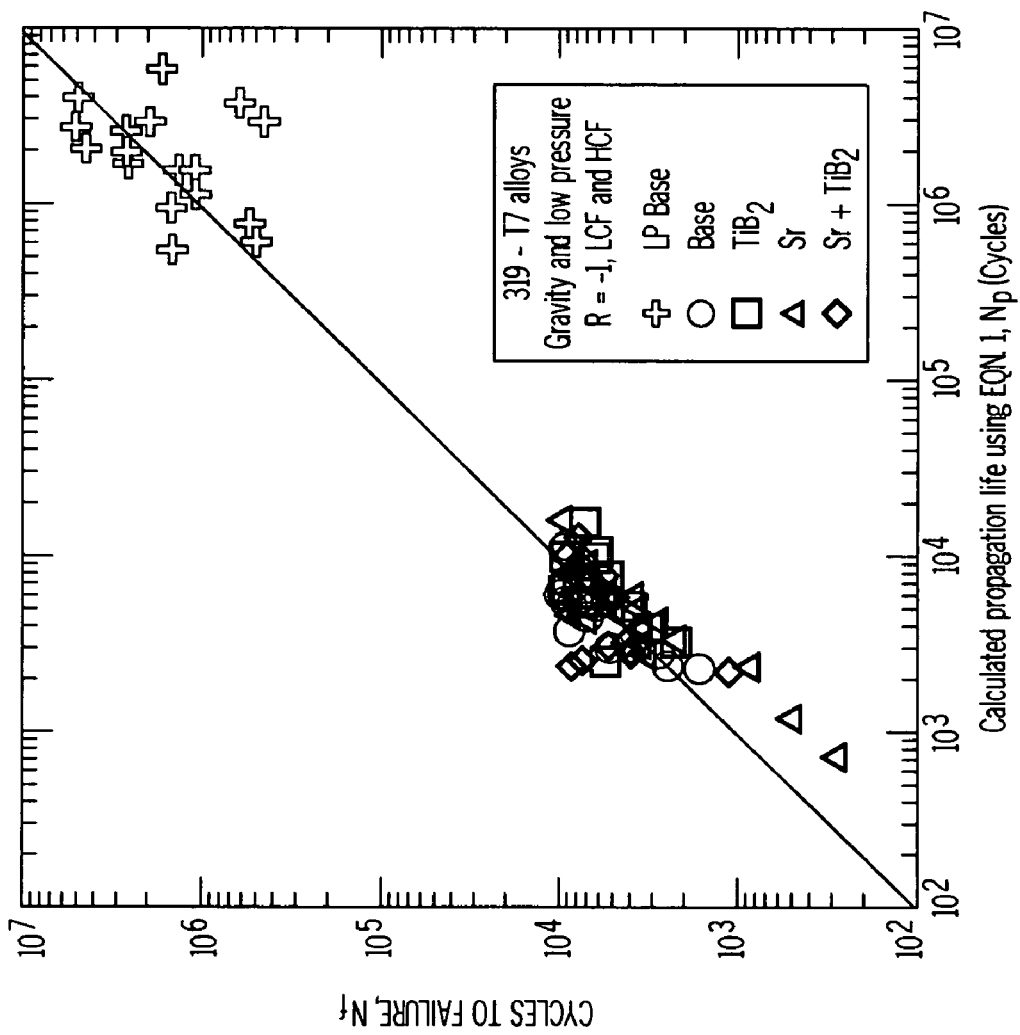
FIG. 4A shows a fatigue life calculation according to an aspect of the present invention, using the long crack life model of equation (1) below for cast 319 samples with large scale casting flaws.
Figure 4B:
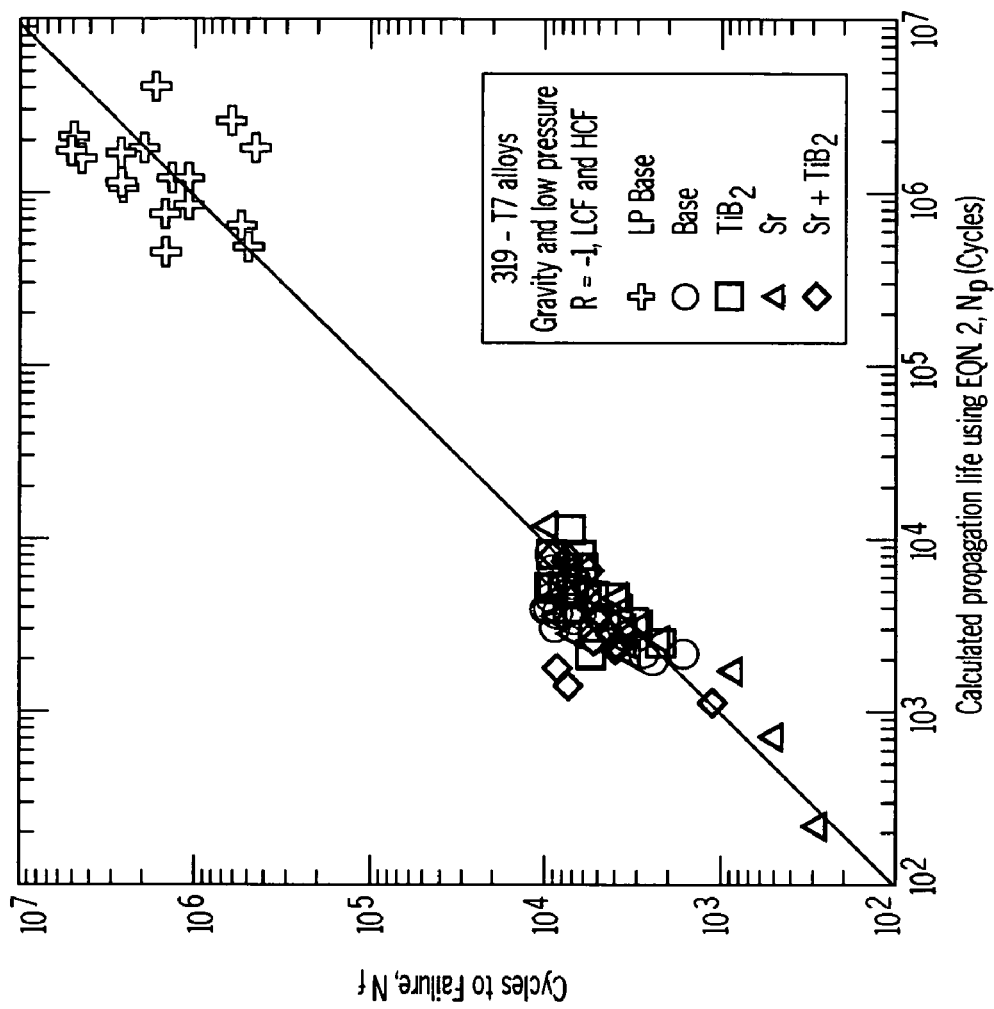
FIG. 4B shows a fatigue life calculation according to an aspect of the present invention, using the short crack life model of equation (2) below for cast 319 samples with large scale casting flaws.

Referring next to FIGS. 4A and 4B in conjunction with FIG. 3, in the presence of casting flaws (i.e., large scale sites) in aluminum castings, such flaws form the dominant mode of fatigue crack initiation. In such circumstances, smaller scale initiators do not significantly impact the fatigue calculations. Moreover, the number of cycles for crack initiation can be ignored ($N_i=0$), so that the fatigue life is mainly spent in crack propagation. The values generated in the figures include aluminum castings with various alloying agents. In the large scale site shown, when the upper bound equivalent flaw size is larger than a critical size (shown as proceeding from decision point 70 to calculation point 80 in FIG. 3), which depends on the microstructure, the fatigue life can be predicted using the following equation:

$$N = N_i + N_p = N_p = C_1 \sigma_a^{-m} a_{eq}^{-(m-2)/2} \quad (1)$$

The critical size is the size at which the crack growth mechanism changes between short and long crack growth, where the former grows very fast at a small stress intensity range parameter ($\Delta K$) at which a long crack normally does not grow. One way to define the critical crack size is to adopt the definition by El Haddad et al. discussed above. Once cracks grow to a critical size, the crack behaves like a long crack with attendant clear crack growth threshold, steady state crack growth, and final fast growth. Likewise, when the upper bound equivalent flaw size is less than the critical size (shown as proceeding from decision point 70 to calculation point 90 in FIG. 3), the fatigue life can be predicted using the following equation:

$$N = N_i + N_p = N_p = C_2 (\epsilon_{max} \sigma_a \sigma_{ys}^{-1})^n a_{eq}^q . \quad (2)$$

A comparison of the calculated propagation life based on equation (1) and the empirical constants with actual fatigue life is made in FIG. 4A. A comparison of the calculated propagation life based on equation (2) and the empirical constants is made with actual fatigue life in FIG. 4B. It can be seen that the calculated fatigue life is in good agreement with the actual fatigue life for cast aluminum with a range of alloying agents.

Figure 5:
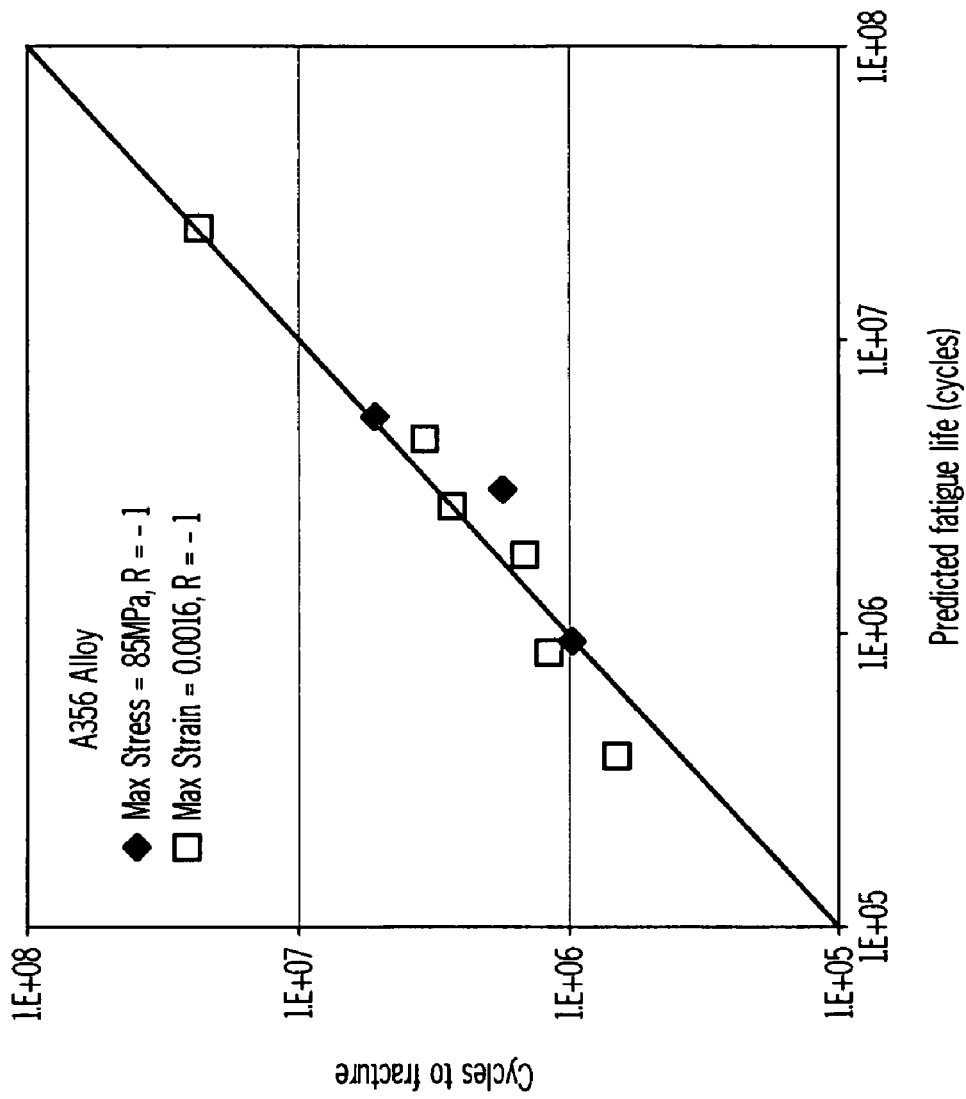
FIG. 5 shows a fatigue life calculation according to an aspect of the present invention, in the presence of cracked and debonded second phase particles without the presence of large scale casting flaws, using equations (3) and (6) below for cast A356 samples.

Referring next to FIG. 5 in conjunction with FIG. 3, in cases of coarse microstructure (for example, in hypoeutectic Al—Si alloys, large SDAS, which is greater than about 50 μm in the eutectic modified alloy or greater than about 30 μm in the unmodified alloy structure), the dense dendrite cell walls act as grain boundaries. The sizes of second phase particles may be as large as the secondary dendrite arm spacing, especially in the unmodified microstructure. In this case, the fatigue life can be predicted using a short crack model which assumes that a fatigue crack initiated from an upper bound second phase particle that fractures or debonds at the first cycle ($N_i=0$). The fatigue life can be predicted using the following equation (shown as proceeding from decision point 100 through decision point 110A to calculation point 120 in FIG. 3):

$$N = N_i + N_p = N_p = C_3 (\epsilon_{max} \sigma_a \sigma_{ys}^{-1})^n d_{eq}^q . \quad (3)$$

The criterion for cracking or debonding of second phase particles applied at decision points 110A and 110B is given as $$\sigma_p = 4\phi\beta\alpha^t \mu_m \gamma^*_{max} \quad (4)$$

where $\sigma_p$ is fracture strength of second phase particle, $\gamma^*_{max}$ is the critical maximum local shear strain, below which fatigue crack initiates by debonding, $\alpha$ is the particle aspect ratio, t is a constant between 0 and 1, $\phi$ is an accommodation factor equal to the elastic strain in the particle divided by the plastic strain in the matrix, and depends on the morphology of particles and the slip system of the matrix, $\beta$ is the modulus correction factor to account for elastic inhomogeneity, $\mu_m$ is the shear modulus of the aluminum matrix. The accommodation factor is equal to 0.393 for spheres and 0.75 for plates in a matrix deforming by multiple slip. When $\sigma_a$ exceeds $\sigma_p$, then particle cracking or debonding becomes the predominant crack initiation mechanism and fatigue life is calculated from equation (3).

In cases involving fine microstructure (i.e., in hypoeutectic Al—Si alloys, a small SDAS less than about 50 μm in the eutectic modified alloy or less than about 30 μm in the unmodified alloy, shown as proceeding from decision point 100 to decision point 110B in FIG. 3), the small dendrites and fine second phase particles make the dendrite cell boundaries more discontinuous. As a result, dislocations can move across the cell boundaries and the slip distance of dislocations is increased from one SDAS to the scale of grain size. In this case, fatigue cracks often initiate from decohesion of second phase particles and then quickly propagate to the grain size by cyclic plastic strain. The crack initiation life can be estimated by:

$$N_i (\Delta\epsilon_{eq}^p)^e = C_4 (d_g)^f \quad (5)$$

The cycles required to propagate the crack from the grain size to final failure can be estimated using long crack model as shown in equation (1). Therefore, the total fatigue life can be calculated at calculation point 140 by:

$$N = N_f + N_p = C_4 (\Delta \epsilon_{eq}^P)^{-e} (d_g)^f + C_5 \sigma_a^{-m} (d_g)^{-(m-2)/2}. \quad (6)$$

A comparison of the calculated fatigue life of samples in which the fatigue crack initiated at one or both of cracked and or debonded second phase particles based on equations (3) and (6) with actual fatigue life is made in FIG. 5. It can be seen that the calculated fatigue life is in good agreement with the actual fatigue life. All the data points shown in FIG. 5 (as well as those of FIGS. 4A and 4B) represent calculations and measurements. Every data point shown contains two life cycles, one that is calculated (i.e., the one on the x-axis) and one that is measured (i.e., the one on the vertical axis).

Figure 6:
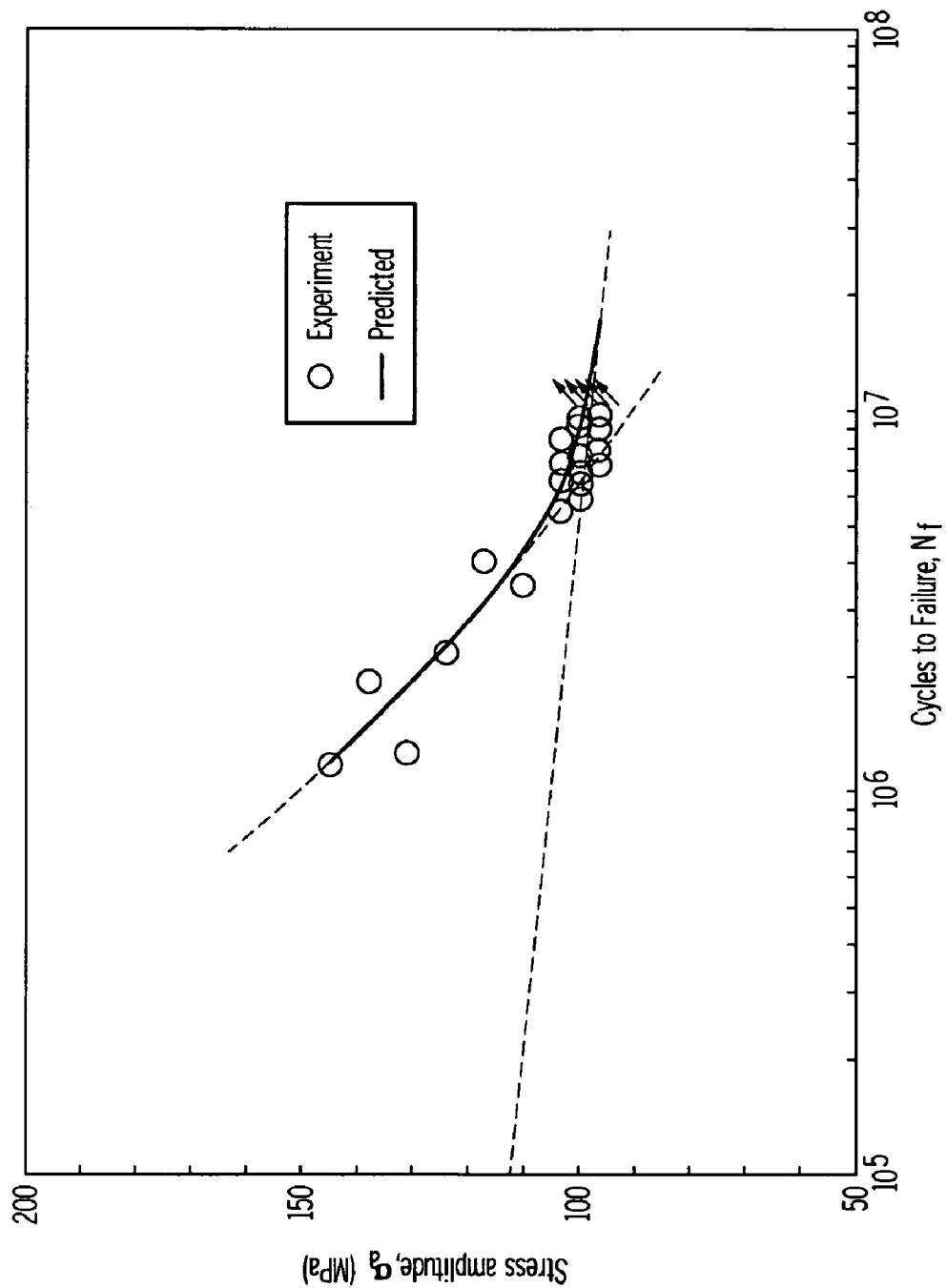
FIG. 6 shows a comparison in an S-N diagram of experimentally-measured fatigue life of lost foam cast 319 samples failed by slip bands to calculations made according to an aspect of the present invention using equation (7) below.
Figure 7:
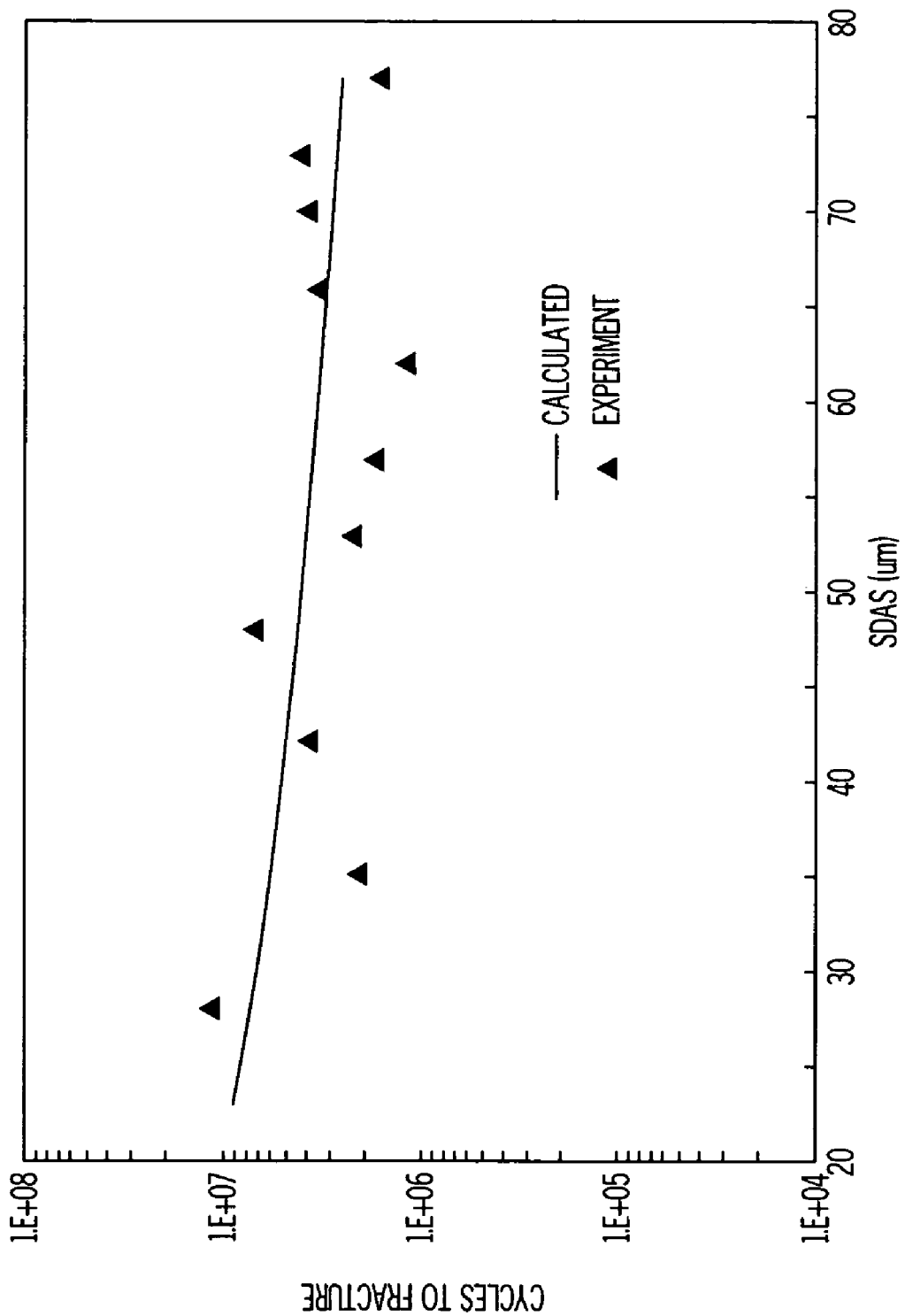
FIG. 7 shows a comparison of actual fatigue life of A356 samples failed by slip bands with the calculated life based on equations (7) and (8) below.

Referring next to FIGS. 6 and 7 in conjunction with FIGS. 2 and 3, a comparison of the calculated fatigue life of samples failed by slip bands is shown. In cases of coarse microstructure, the fatigue life of aluminum components in which the fatigue crack initiated at persistent slip bands at calculation point 130 can be estimated by:

$$N = N_f + N_p = C_6 (\Delta \epsilon_{eq}^P)^{-e} (\lambda_{eq})^f + C_7 (\epsilon_{max} \sigma_a \sigma_{ys}^{-1})^n (\lambda_{eq})^q \quad (7)$$

where $\lambda_{eq}$ is the equivalent mean free path of aluminum matrix (such as SDAS in hypoeutectic Al—Si alloys). As before, the dense dendrite cell walls act as grain boundaries in the large SDAS microstructures (i.e. greater than about 50 µm in the eutectic modified alloy or greater than about 30 µm in the unmodified alloy). Similarly, in cases of fine microstructure (i.e. SDAS less than about 50 µm in the eutectic modified alloy or less than about 30 µm in the unmodified alloy), the fatigue life of aluminum components in which the fatigue crack initiated at persistent slip bands at calculation point 150 can be estimated by:

$$N = N_f + N_p = C_8 (\Delta \epsilon_{eq}^P)^{-e} (d_g)^f + C_9 \sigma_a^{-m} (d_g)^{-(m-2)/2}. \quad (8)$$

From the figures, it can be seen that the calculated fatigue life is in good agreement with the actual fatigue life when calculations are made using estimates of the upper bound of crack initiator size. R (shown in FIG. 2, as well as FIGS. 4A, 4B and 5) is the ratio of minimum and maximum stresses in the cyclic stress amplitude during fatigue. Thus, situations where R equals −1 means the applied stress is fully reversed.

In the above equations, $C_1$ through $C_9$, e, f, m, n, and q are constants, $\sigma_a$ is the stress amplitude, $\sigma_{ys}$ is yield strength, $\epsilon_{max}$ is the maximum total strain during loading cycle and $a_{eq}$ is the EVS equivalent initial crack-like defect or flaw size. Likewise, $d_{eq}$ is the EVS estimate of the equivalent initial crack-like second phase particle size. The EVS estimate of the equivalent mean free path of aluminum matrix is given by $\lambda_{eq}$, while $\Delta \epsilon_{eq}^P$ is a local equivalent plastic strain and $d_g$ is the EVS estimate of equivalent grain size.

In sum, the present inventors have discovered that fatigue performance of a given volume element in a cast aluminum component is controlled by extremes in maximum flaw size, maximum second phase particle size, maximum slip plane size or the like. They have further discovered that the characteristic parameters of casting flaws and microstructures (such as $a_{eq}$, $d_{eq}$, $\lambda_{eq}$, and d) employed in the above MSF equations should be extreme size values of flaw and microstructural constituents in such a given volume. This is especially valuable for certain parameters, such as $a_{eq}$, the equivalent initial crack-like defect or flaw size (discussed below), which are difficult to predict with a high degree of certainty. The present inventors have additionally discovered that the application of EVS to MSF allows for the generation of equivalent values for dimensions that are otherwise hard to determine or quantify, thereby leading to more accurate predictions of the fatigue properties of cast components that embody such flaws, second phase particles, persistent slip bands or the like. For example, two dimensional metallographic pore size data that is reported as an "equivalent circle diameter" can be combined with a reported aspect ratio for the pore to create input data for EVS calculations of pore sizes.

Extreme Value Statistics

Micro-focus X-ray Computed Tomography (CT) techniques have the potential to characterize microporosity with a relatively high resolution, for example, within a few micrometers. Presently, the technique is not widely used in practice, especially for large parts (such as engine blocks), because it requires significant computational resources. In addition, this technique still has limitations in characterization of oxides and second phase particles due to the nature of the X-ray imaging source. Nevertheless, the present inventors believe such techniques can provide valuable insight into accurately characterizing microporosity and its attendant impact upon fatigue properties.

While the mathematical modeling of casting processes is now highly advanced, with commercial programs available to predict mold filling and solidification behavior for virtually any casting process, the prediction of microporosity is less advanced. State of the art commercial codes use an interdendritic flow model that assumes pores are spherical with a diameter equal to a predefined fraction of the SDAS in hypoeutectic Al—Si alloys. Difficulty with this assumption arises because individual pores are often much larger than, as well as assume different shapes from, the SDAS. In addition, there is no computational tool presently available for accurate prediction of oxides and second phase particles.

As such, certain parameters (including calculation inputs such as the size of casting defects, microstructural data or the like) are difficult to quantify. Metallographic techniques are widely utilized in practice to characterize casting flaws and microstructures in two dimensions (2D). With the conventional 2D metallographic data, the size distributions of casting flaws, inclusions and other microstructure features can be well described by EVS with a cumulative distribution function such as:

$$F(x) = \exp\left(-\exp\left(-\frac{x-\lambda}{\delta}\right)\right) \quad (9)$$

where x is the characteristic parameter of flaws or microstructural features, and $\lambda$ and $\delta$ are referred to as the EVS location and the scale parameters (also referred to as distribution parameters), respectively. It will be appreciated by those skilled in the art that while equation (9) was used in the present discovery, it is merely exemplary of such functions, and other similar distribution functions can be used to best fit the experimental data.

Considering a population of flaws or microstructure features as an example, an estimate of the distribution parameters $\lambda$ and $\delta$ can be made by different methods, where the most commonly used and convenient method is ordering/ranking statistics together with a linear regression. The characteristic flaw or microstructural feature parameters are ordered from the smallest to the largest with each assigned a probability based on its ranking (j), as follows $$F = \frac{j - 0.5}{n} \quad (10)$$

where n is the total number of data points. Equation (9) can be rearranged to a linear equation by twice taking its natural logarithm and transforming the parameters F(x) to ln(−ln F(x)) and the parameter x as follows:

$$-\ln(-\ln(F(x))) = \frac{1}{\delta} \cdot x - \frac{\lambda}{\delta} \quad (11)$$

The EVS parameters $\lambda$ and $\delta$ can then be calculated from maximum likelihood moment or least squares methods. When the sample size is small (for example, approximately 30 flaws or microstructure features), the maximum likelihood method gives the most efficient estimates. For a large number of samples (for example, where n is greater than about 50), the maximum likelihood, moment, and least square methods give similar precision.

The characteristic flaw or microstructure feature parameters predicted by EVS depend on the volume of material for which the prediction is sought. The volume effect is accounted for by the return period T, where two such periods, T and $T_b$, are considered. T accounts for the volume sampled compared to the volume of one part. The T return period of the maximal flaw or microstructure features in a given casting is usually determined by:

$$T = \frac{V}{V_0} \quad (12)$$

where V is the volume of a casting and $V_0$ is the volume of the specimen for flaw or microstructure features measurement.

Next, the volume effect is extrapolated to represent the population. The population is represented by a batch of N castings. The return period of the extreme flaw or microstructure features occurring once in a batch of N castings is:

$$T_b = T^*N \quad (13)$$

Once the volume effects are accounted for, the characteristic flaw or microstructure feature parameters can be estimated using:

$$x(T_b) = \lambda - \delta \ln\left[-\ln\left(1 - \frac{1}{T_b}\right)\right] \quad (14)$$

and x+3σ estimate on the maximal flaw or microstructure feature characteristic parameter can be made. The standard deviation is estimated by the Cramer-Rao lower bound:

$$SD[x(T_b)] = \frac{\delta}{\sqrt{n}} \cdot \sqrt{0.60793y^2 + 0.51404y + 1.10866} \quad (15)$$

where y is the reduced variate of EVS, $$y = -\ln\left(-\ln\left(1 - \frac{1}{T_b}\right)\right)$$

and n is number of analyzed flaws or microstructure features.

The minimum theoretical 99.94% (+3 standard deviations) confidence interval of $x(T_b)$ is given by $$x(T_b) + 3 \cdot SD[x(T_b)] \quad (16)$$

and x "+3σ" estimate of the maximum flaw or microstructure feature characteristic parameter in certain number of castings is given by:

$$x = \lambda - \delta \ln\left[-\ln\left(1 - \frac{1}{T_b}\right)\right] + 3(SD[x(T_b)]) \quad (17)$$

Figure 8:
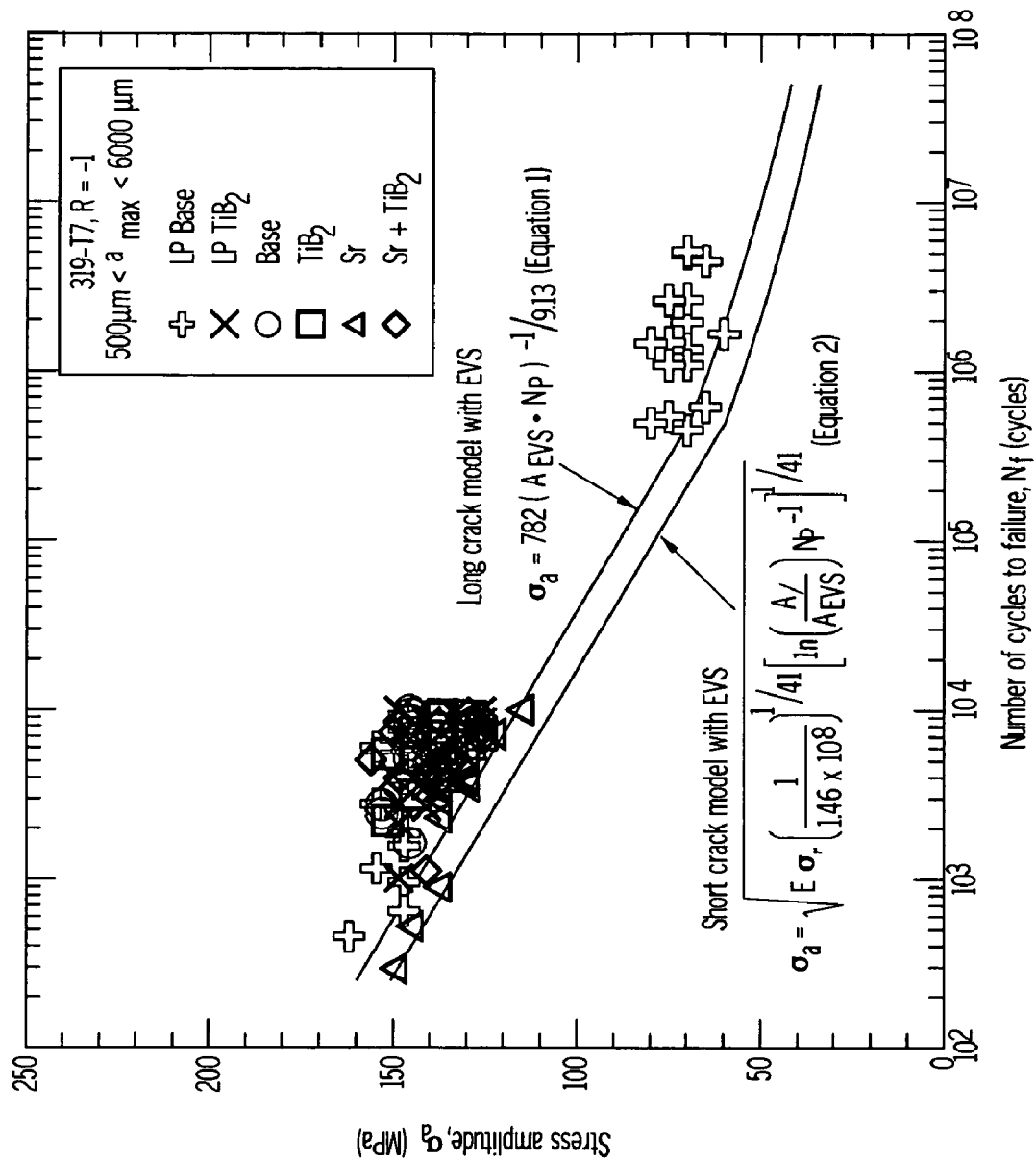
FIG. 8 shows S-N data together with the prediction of both long crack and short crack models of equations (1) and (2) using the EVS estimated maximum pore sizes according to an aspect of the present invention.
Figure 9B:
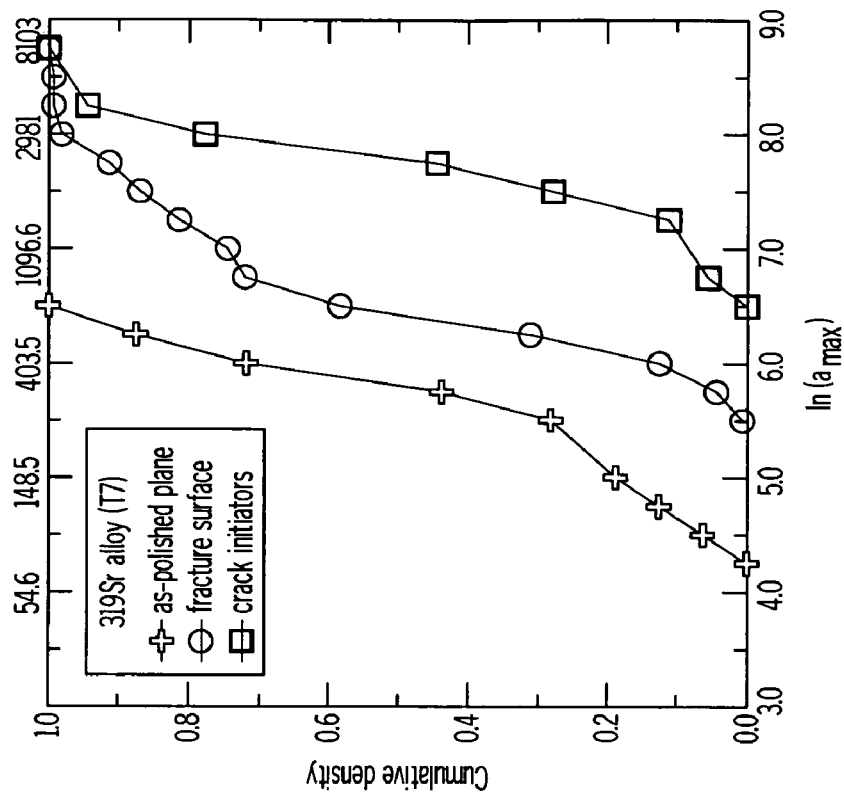
FIG. 9B shows a comparison of maximum pore sizes as observed on as-polished planes and fracture surfaces for a 319 alloy that has strontium and titanium diboride added.
Figure 9A:
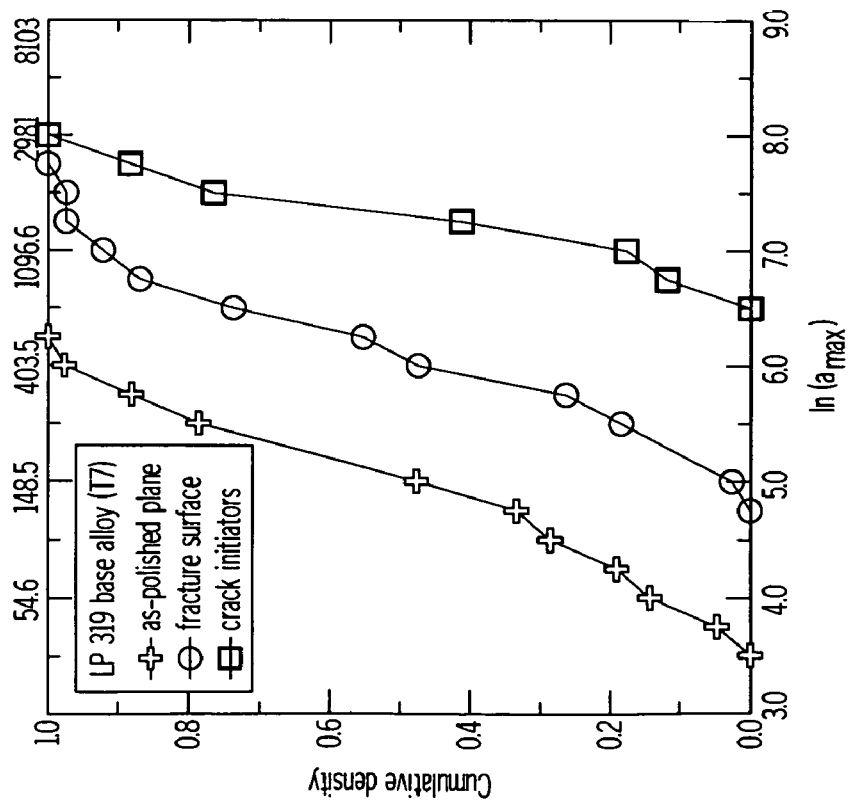
FIG. 9A shows a comparison of maximum pore sizes as observed on as-polished planes and fracture surfaces for a low pressure cast 319 base alloy.
Figure 10:
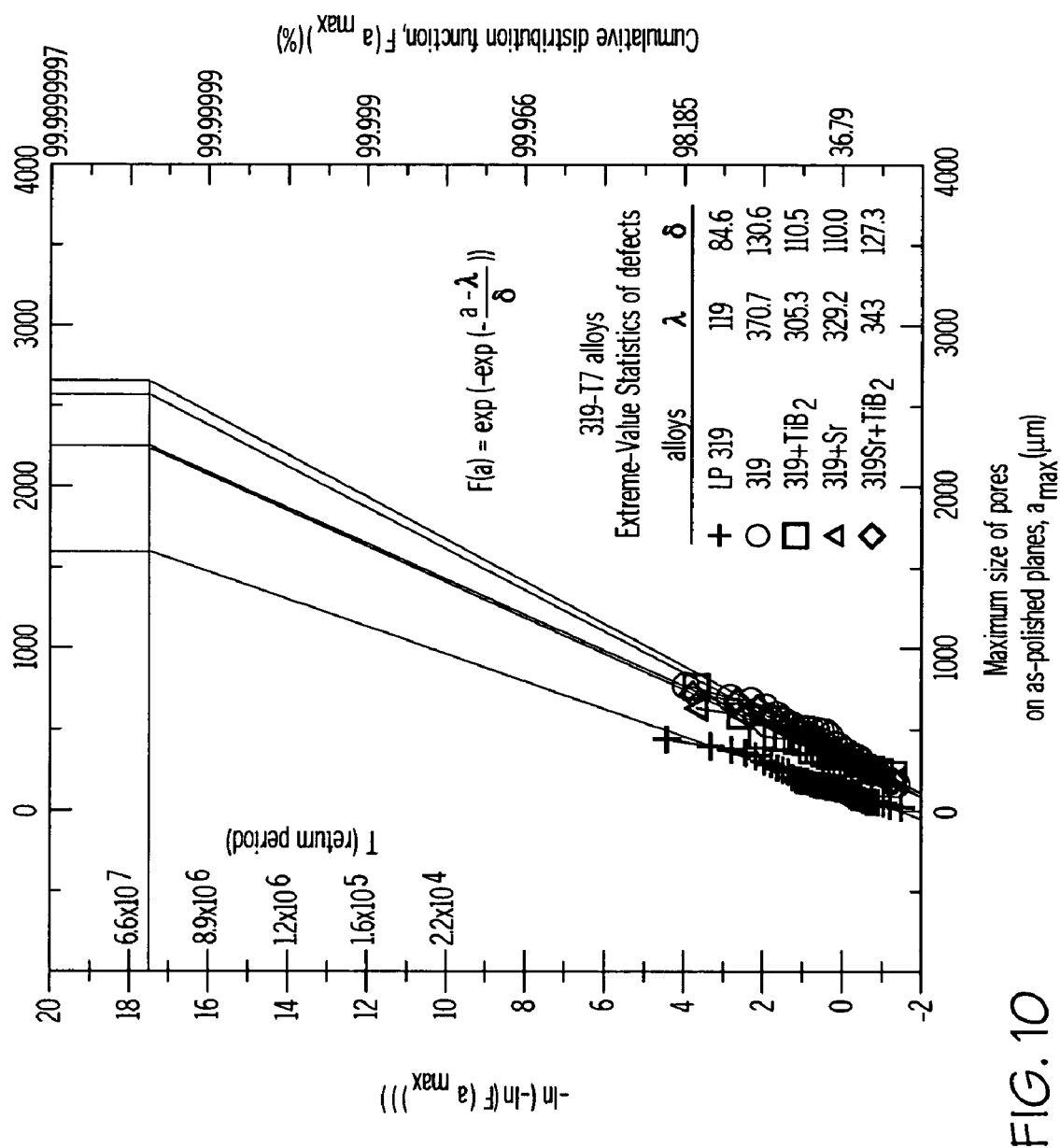
FIG. 10 shows an EVS plot of maximum pore sizes observed on the surfaces of various 319 alloys.

Referring next to FIG. 8, a graph compares the predicted fatigue life based on equations (1) and (2) using the EVS estimated extreme pore sizes with the experimental data. It is seen that with the upper bound of EVS estimation of the extreme pore size, both long crack and short crack models can give conservative lower bound fatigue life predictions. As shown in FIGS. 9A, 9B, and 10, the fractographically characterized origins are of similar scale to the upper bound of the two dimensional as-polished plane porosity size distribution modelled using the EVS method. Specifically, EVS can estimate the maximum 3D characteristic dimensions, which are otherwise difficult and costly to obtain, from readily available 2D measurements. It will be appreciated that if actual 3D dimensions for any given portion of a casting sample are determined, EVS may not be needed.

Referring next to FIGS. 9A and 9B, metallographic measurements of porosity are used as input for the fatigue life prediction models discussed above. As can be seen, a significant difference was observed between pore sizes measured on as-polished planes (designated by the crosses) and those measured on fracture surfaces (designated by the circles). As illustrated with particularity in FIG. 9A, the pores observed on the fracture surfaces are two to five times larger than those observed on the metallographic planes, regardless of the alloy and casting process. Furthermore, pores that are located at the fatigue crack origin are even larger (two to three times) than those observed in other areas of the fracture surfaces, indicating that the largest pores initiated fatigue cracks. Thus, the direct use of metallographic measurements may significantly overestimate the fatigue strength and the available life of a particular cast component. As such, it may be preferable to use metallographic measurements as a qualitative indication of pore sizes present in the material rather than as direct inputs to fracture mechanics models to predict fatigue performance of the material.

Referring next to FIG. 10, the calculated pore size distributions of five different 319 castings (including low pressure cast base 319 alloy (LP 319), gravity poured base 319 alloy (319), gravity poured base 319 with grain refinement (319+ $TiB_2$), gravity poured 319 with strontium modification (319+ Sr), and gravity poured base 319 with both grain refinement and strontium modification (319+Sr+$TiB_2$): the EVS parameters $\lambda$ and $\delta$ are estimated and given in the plot. The corresponding dimensions of the maximum pores for five different castings estimated using EVS are compared to pore sizes measured on as-polished planes and fracture surfaces in Table 1.

TABLE 1

| Alloys and Casting Process | Maximum pore size (μm) | | |
|---|---|---|---|
| | As-polished | Fracture surface | EVS estimation |
| LP Base 319 | 167 | 1668 | 1594 |
| Base 319 | 445 | 968 | 2646 |
| Base 319 + TiB$_2$ | 368 | 1104 | 2231 |
| Base 319 + Sr | 391 | 2483 | 2246 |
| Base 319 + Sr+ TiB$_2$ | 415 | 2027 | 2562 |

Table 1 shows that good agreement is observed between the extreme values of pore sizes estimated from metallographic data and those as measured on the fracture surfaces. The mean EVS estimates are the same magnitude as those measured on fracture surface. This suggests that EVS is a good approach for estimating the maximum pore size in the material based on traditional metallographic measurements.

Figure 11:
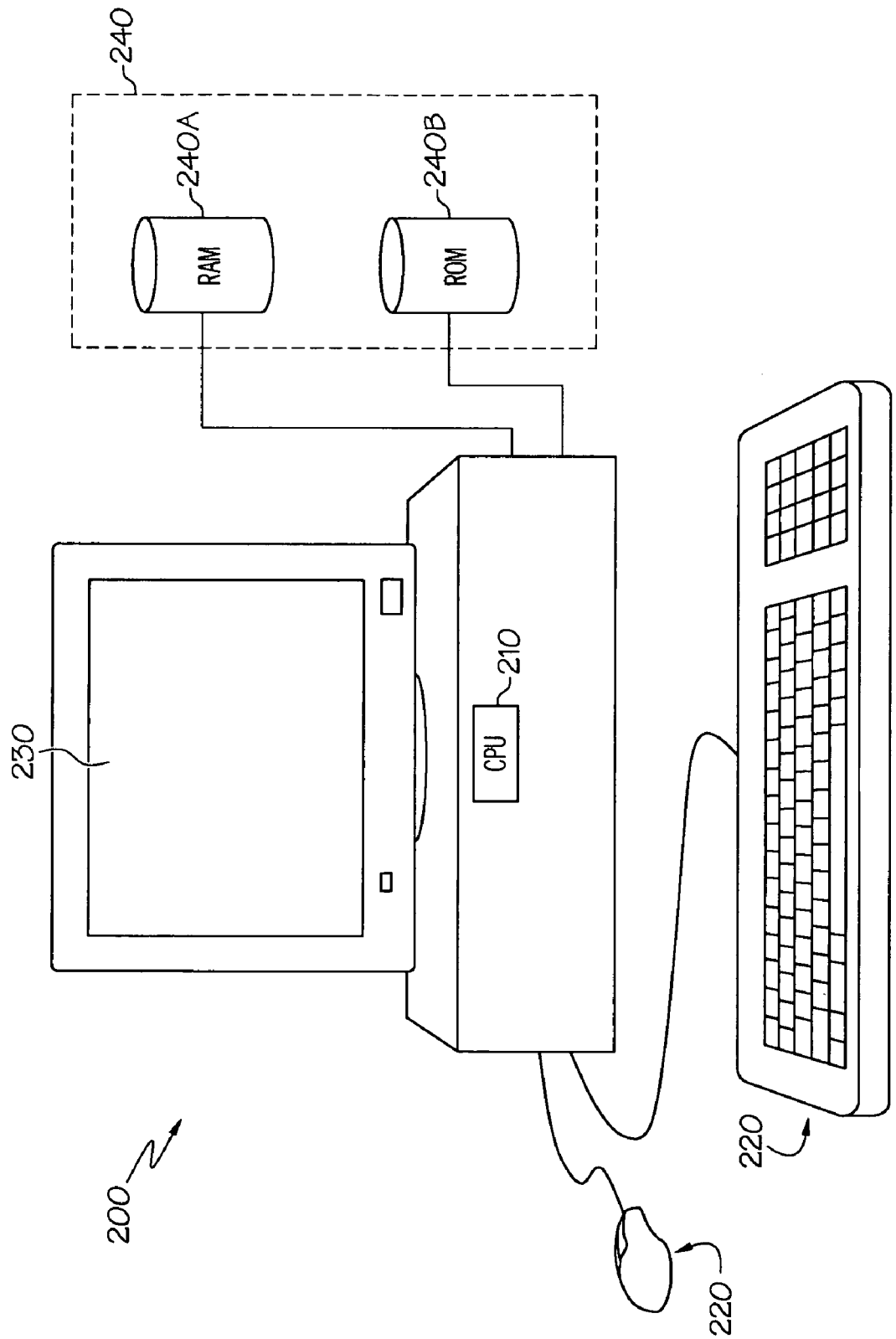
FIG. 11 shows an article of manufacture incorporating an algorithm employing equations (1) through (17) below, according to an embodiment of the present invention.

Referring next to FIG. 11, the present calculations involving MSF and EVS may be embodied in an algorithm that can be run on a computation device 200. Computation device 200 (shown in the form of a desktop computer, but understood by those skilled in the art as also capable of being a mainframe, laptop, hand-held, cellular or other related computational device) includes a central processing unit 210, input 220, output 230 and memory 240, the latter of which may include random access memory (RAM) 240A and read-only memory (ROM) 240B, where the former generally refers to volatile, changeable memory and the latter to more permanent, non-alterable memory, although with recent developments, such distinctions are becoming increasingly evanescent. While either ROM 240B or RAM 240A could be used as a computer-readable medium upon which program code representative of some or all of the aforementioned fatigue life prediction equations (1) through (17) can be run, it will be understood by those skilled in the art that when such program code is loaded into the computation device 200 for subsequent reading and operation upon by the central processing unit 210, it will typically reside in RAM 240A. Thus, in one preferable form, the algorithm can be configured as computer-readable software such that when loaded into memory 240, it causes a computer to calculate fatigue life based on a user's input. The computer-readable medium containing the algorithm can additionally be introduced into computation device 200 through other portable means, such as compact disks, digital video disks, flash memory, floppy disks or the like. Regardless of the form, upon loading, the computer readable medium includes the computer executable instructions adapted to effect the decision-making process depicted in FIG. 3. As will be appreciated by those skilled in the art, the computation device 200 may optionally include peripheral equipment. For example, the computation device 200 may form the basis for a system that can be used to predict fatigue life in aluminum castings. The system may additionally include measuring, testing and sampling equipment (not shown) such that fatigue data taken directly from a sample casting may be loaded into memory 240 or elsewhere for subsequent comparison to predicted data or the like.

While certain representative embodiments and details have been shown for purposes of illustrating the invention, it will be apparent to those skilled in the art that various changes may be made without departing from the scope of the invention, which is defined in the appended claims.

What is claimed is:

1. A method of predicting fatigue life for an aluminum based casting where at least one fatigue crack initiation site is presumed or determined to be present therein, said method comprising:

using extreme value statistical methods to estimate an upper bound initiation site size expected to occur in the casting; and calculating on a computer said fatigue life based on said initiation site size using multiscale fatigue equations wherein a choice of which of said multiscale fatigue equations is selected is based upon at least one of a predominant form of said upper bound initiation site and a mean free path through an aluminum matrix of said aluminum based casting, wherein said predominant form of said upper bound initiation site comprises at least one of a casting flaw, a second phase particle and a persistent slip band, wherein said calculating comprises:

using the equation $$N = N_i + N_p = N_p = C_1 \sigma_a^{-m} a_{eq}^{-(m-2)/2}$$

in situations where said upper bound initiation site predominantly comprises said casting flaw such that a maximum flaw size of said casting flaw is larger than a critical size, whereas in situations where said maximum flaw size is smaller than said critical size, using the equation $$N = N_i + N_p = N_p = C_2 (\epsilon_{max} \sigma_a \sigma_{ys}^{-1})^n a_{eq}^q;$$

using the equation $$N = N_i + N_p = N_p = C_3 (\epsilon_{max} \sigma_a \sigma_{ys}^{-1})^n d_{eq}^q$$

in situations where said upper bound initiation site predominantly comprises said second phase particle and where a mean free path through an aluminum matrix associated with transgranular crack propagation is present and evidence of at least one of cracking and debonding of said second phase particle is present or anticipated, whereas in situations where said mean free path through said aluminum matrix associated with intergranular crack propagation is present and evidence of at least one of cracking and debonding of said second phase particle is present or anticipated, using the equation $$N = N_i + N_p = C_4 (\Delta \epsilon_{eq}^p)^{-e} (d_g)^f + C_5 \sigma_a^{-m} (d_g)^{-(m-2)/2}; \text{ or}$$

using the equation $$N = N_i + N_p = C_6 (\Delta \epsilon_{eq}^p)^{-e} (\lambda_{eq})^f + C_7 (\epsilon_{max} \sigma_a \sigma_{ys}^{-1})^n (\lambda_{eq})^q;$$

in situations where said upper bound initiation site predominantly comprises said persistent slip band and where a size of said persistent slip band is constrained by a mean free path through said aluminum matrix that is smaller than a grain size is present and evidence of at least one of cracking and debonding of said second phase particle is not present or anticipated, whereas in situations where said initiation site predominantly comprises said persistent slip band and where a size of said persistent slip band is unconstrained by a mean free path through the aluminum matrix that is smaller than a grain size is present and evidence of at least one of cracking and debonding of said second phase particle is not present or anticipated, using the equation $$N = N_i + N_p = C_8 (\Delta \epsilon_{eq}^p)^{-e} (d_g)^f + C_9 \sigma_a^{-m} (d_g)^{-(m-2)/2},$$

wherein $C_1$ through $C_9$, m, n, e, f and q are constants, $\sigma_a$ is a stress amplitude, $\sigma_{ys}$ is a yield strength, $\epsilon_{max}$ is a maximum total strain during loading cycle, $\epsilon_{max}$ is maximum total strain during loading cycle, $a_{eq}$ is an equivalent initial crack-like defect size, $d_{eq}$ is an equivalent initial crack-like second phase particle size, $\lambda_{eq}$ is an equivalent mean free path through said aluminum matrix, $\Delta\epsilon_{eq}^{p}$ is a local equivalent plastic strain and $d_g$ is equivalent grain size.

2. The method of claim 1, wherein said critical size to distinguish between small and long crack behavior is determined for a particular alloy and microstructure by estimating a boundary therebetween as a function of at least one of a long crack growth threshold, fatigue strength and a geometric factor.

3. The method of claim 1, wherein at least one fatigue crack initiation site is determined by at least one of direct measurement and analytical prediction.

4. The method of claim 3, wherein said analytical prediction comprises computational simulation and modeling.

5. The method of claim 3, wherein said direct measurement comprises at least one of X-ray computed tomography, single and serial sectioning metallography and fractography.

6. The method of claim 1, wherein said extreme value statistics are used in conjunction with at least one of 2D metallographic techniques, fractographic techniques, X-ray computed tomography and computational simulation and modelling to estimate values of casting flaw and microstructure feature populations.

7. The method of claim 1, wherein said extreme value statistics use a cumulative distribution function to provide upper bound flaw and feature size estimates.

8. The method of claim 7, wherein said cumulative distribution function is represented by the equation $$F(x) = \exp\left(-\exp\left(-\frac{x-\lambda}{\delta}\right)\right)$$

where x is a characteristic parameter of at least one of flaws and microstructural features, and where $\lambda$ and $\delta$ are extreme value statistics location and scale parameters, respectively.

9. The method of claim 1, wherein criterion for estimating the cracking or debonding of second phase particles is according to the equation $\sigma_p = 4\phi\beta\alpha^t\mu_m\gamma^*_{max}$ where $\sigma_p$ is fracture strength of second phase particle, $\gamma^*_{max}$ is the critical maximum local shear strain, below which fatigue crack initiates by debonding, $\alpha$ is the particle aspect ratio, t is a constant between 0 and 1, $\phi$ is an "accommodation factor" equal to the elastic strain in the particle divided by the plastic strain in the matrix and depends on the morphology of particles and the slip system of the matrix, and is equal to 0.393 for spheres and 0.75 for plates in a matrix deforming by multiple slip, $\beta$ is the modulus correction factor to account for elastic inhomogeneity and $\mu_m$ is the shear modulus of the aluminum matrix.

10. An article of manufacture comprising a computer usable medium having computer readable program code embodied therein for predicting fatigue life in an aluminum casting, said computer readable program code in said article of manufacture comprising:

computer readable program code portion for causing a computer to determine which of a casting flaw, second phase particle and persistent slip band predominates as a cause of fatigue failure;

computer readable program code portion for causing the computer to calculate a predicted fatigue life based on extreme value statistics and a multiscale fatigue algorithm the latter of which is based on which of said predominant cause of fatigue failure is determined, wherein said multiscale fatigue life algorithm is configured such that in situations where fatigue behavior of the casting is dominated by said casting flaw, said multiscale fatigue life algorithm uses the equation $$N = N_i + N_p = N_p = C_1\sigma_a^{-m}a_{eq}^{-(m-2)/2}$$

in situations where a maximum flaw size in the casting is larger than a critical size, whereas in situations where said maximum flaw size is smaller than a critical size, said multiscale fatigue life algorithm uses the equation $$N = N_i + N_p = N_p = C_2(\epsilon_{max}\sigma_a\sigma_{ys}^{-1})^n a_{eq}^q;$$

wherein said multiscale fatigue life algorithm is configured such that in situations where fatigue behavior of the casting is dominated by at least one of said second phase particle and where a mean free path through an aluminum matrix associated with transgranular crack propagation is present and evidence of at least one of cracking and debonding of said second phase particle is present or anticipated, said multiscale fatigue life algorithm uses the equation $$N = N_i + N_p = N_p = C_3(\epsilon_{max}\sigma_a\sigma_{ys}^{-1})^n d_{eq}^q,$$

whereas in situations where said mean free path through said aluminum matrix associated with intergranular crack propagation is present and evidence of at least one of cracking and debonding of said second phase particle is present or anticipated, said multiscale fatigue life algorithm uses the equation $$N = N_i + N_p = C_4(\Delta\epsilon_{eq}^p)^{-e}(d_g)^f + C_5\sigma_a^{-m}(d_g)^{-(m-2)/2};$$

wherein said multiscale fatigue life algorithm is configured such that in situations where fatigue behavior of the casting is dominated by at least one said persistent slip band and where said persistent slip band size is constrained by a mean free path through said aluminum matrix that is smaller than a grain size is present and evidence of at least one of cracking and debonding of said second phase particle is neither present nor anticipated, said multiscale fatigue life algorithm uses the equation $$N = N_i + N_p = C_6(\Delta\epsilon_{eq}^p)^{-e}(\lambda_{eq})^f + C_7(\epsilon_{max}\sigma_a\sigma_{ys}^{-1})^n(\lambda_{eq})^q,$$

whereas in situations where said initiation site predominantly comprises said persistent slip band unconstrained by a mean free path through said aluminum matrix smaller than the grain size is present and evidence of at least one of cracking and debonding of said second phase particle is neither present nor anticipated, said multiscale fatigue life algorithm uses the equation $$N = N_i + N_p = C_8(\Delta\epsilon_{eq}^p)^{-e}(d_g)^f + C_9\sigma_a^{-m}(d_g)^{-(m-2)/2},$$

wherein $C_1$ through $C_9$, m, n, e, f and q are constants, $\sigma_a$ is a stress amplitude, $\sigma_{ys}$ is a yield strength, $\epsilon_{max}$ is a maximum total strain during loading cycle, $\epsilon_{max}$ is maximum total strain during loading cycle, $a_{eq}$ is an equivalent initial crack-like defect size, $d_{eq}$ is an equivalent initial crack-like second phase particle size, $\lambda_{eq}$ is an equivalent mean free path through said aluminum matrix, $\Delta\epsilon_{eq}^p$ is a local equivalent plastic strain and $d_g$ is equivalent grain size; and computer readable program code portion configured to output results calculated by at least one of said equations to at least one of a machine-readable format and a human-readable format.

11. The article of manufacture of claim 10, wherein said determining which of a casting flaw, second phase particle and persistent slip band predominates as a cause of fatigue failure comprises at least one of direct measurement and analytical prediction.

12. The article of manufacture of claim 10, wherein said critical size to distinguish between small and long crack behavior is determined for a particular alloy and microstructure by estimating a boundary therebetween as a function of at least one of a long crack growth threshold, fatigue strength and a geometric factor.

13. The article of manufacture of claim 10, wherein said extreme value statistics use a cumulative distribution function to provide upper bound flaw and feature size estimates.

14. The article of manufacture of claim 13, wherein said cumulative distribution function is represented by the equation $$F(x) = \exp\left(-\exp\left(-\frac{x-\lambda}{\delta}\right)\right)$$

where x is a characteristic parameter of at least one of flaws and microstructural features, and where $\lambda$ and $\delta$ are extreme value statistics location and scale parameters, respectively.

15. The article of manufacture of claim 13, wherein criterion for estimating the cracking or debonding of second phase particles is according to the equation $$\sigma_p = 4\phi\beta\alpha^t\mu_m\gamma^*_{max}$$

where $\sigma_p$ is fracture strength of second phase particle, $\gamma^*_{max}$ is the critical maximum local shear strain, below which fatigue crack initiates by debonding, $\alpha$ is the particle aspect ratio, t is a constant between 0 and 1, $\phi$ is an "accommodation factor" equal to the elastic strain in the particle divided by the plastic strain in the matrix and depends on the morphology of particles and the slip system of the matrix, and is equal to 0.393 for spheres and 0.75 for plates in a matrix deforming by multiple slip, $\beta$ is the modulus correction factor to account for elastic inhomogeneity and $\mu_m$ is the shear modulus of the aluminum matrix.

16. A machine for predicting fatigue life in aluminum castings, said machine comprising:

a device configured to acquire at least one of measured or predicted sample defect information; and a computing member configured to accept fatigue property data gathered from said device and further configured to calculate fatigue properties of the casting in accordance to instructions provided by a computer-readable program, said program comprising:

a code portion for causing said computing member to determine which of a casting flaw, second phase particle and persistent slip band predominates as a cause of fatigue failure;

a code portion for causing said computing member to calculate a predicted fatigue life by using extreme value statistical methods to estimate an upper bound initiation site size expected to occur in the casting and multiscale fatigue equations where at least one of said multiscale fatigue equations is selected based upon which of said casting flaw, second phase particle and persistent slip band predominates, wherein situations where fatigue behavior of the casting is dominated by the casting flaw, said code portion uses the equation $$N = N_i + N_p = N_p = C_1 \sigma_a^{-m} a_{eq}^{-(m-2)/2}$$

in situations where a maximum flaw size in the casting is larger than a critical size, whereas in situations where said maximum flaw size is smaller than a critical size, using the equation $$N = N_i + N_p = N_p = C_2(\epsilon_{max}\sigma_a\sigma_{ys}^{-1})^n a_{eq}^{q};$$

wherein situations where fatigue behavior of the casting is dominated by at least one second phase particle and where a mean free path through an aluminum matrix associated with transgranular crack propagation is present and evidence of at least one of cracking and debonding of said second phase particle is present or anticipated, said code uses the equation $$N = N_i + N_p = N_p = C_3(\epsilon_{max}\sigma_a\sigma_{ys}^{-1})^n d_{eq}^{q},$$

whereas in situations where said mean free path through an aluminum matrix associated with intergranular crack propagation is present and evidence of at least one of cracking and debonding of said second phase particle is present or anticipated, by using the equation $$N = N_i + N_p = C_4(\Delta\epsilon_{eq}^p)^{-e}(d_g)^f + C_5\sigma_a^{-m}(d_g)^{-(m-2)/2};\text{ and}$$

wherein situations where fatigue behavior of the casting is dominated by persistent slip bands and where said persistent slip band size is constrained by a mean free path through said aluminum matrix that is smaller than a grain size is present and evidence of at least one of cracking and debonding of second phase particles is neither present nor anticipated, said code uses the equation $$N = N_i + N_p = C_6(\Delta\epsilon_{eq}^p)^{-e}(\lambda_{eq})^f + C_7(\epsilon_{max}\sigma_a\sigma_{ys}^{-1})^n(\lambda_{eq})^q,$$

whereas in situations where said initiation site predominantly comprises said persistent slip band unconstrained by a mean free path through said aluminum matrix that is smaller than a grain size is present and evidence of at least one of cracking and debonding of second phase particles is neither present nor anticipated, using the equation $$N = N_i + N_p = C_8(\Delta\epsilon_{eq}^p)^{-e}(d_g)^f + C_9\sigma_a^{-m}(d_g)^{-(m-2)/2},$$

wherein $C_1$ through $C_9$, m, n, e, f and q are constants, $\sigma_a$ is a stress amplitude, $\sigma_{ys}$ is a yield strength, $\epsilon_{max}$ is a maximum total strain during loading cycle, $\epsilon_{max}$ is maximum total strain during loading cycle, $a_{eq}$ is an equivalent initial crack-like defect size, $d_{eq}$ is an equivalent initial crack-like second phase particle size, $\lambda_{eq}$ is an equivalent mean free path through said aluminum matrix, $\Delta\epsilon_{eq}^p$ is a local equivalent plastic strain and $d_g$ is equivalent grain size.

17. The machine of claim 16, further comprising a code portion of said program configured to output results calculated by at least one of said equations to at least one of a machine readable format and a human readable format.

18. The machine of claim 16, wherein said critical size to distinguish between small and long crack behavior is determined for a particular alloy and microstructure by estimating a boundary therebetween as a function of at least one of a long crack growth threshold, fatigue strength and a geometric factor.

19. The machine of claim 16, wherein said extreme value statistics use a cumulative distribution function to provide upper bound flaw and feature size estimates and wherein said cumulative distribution function is represented by the equation $$F(x) = \exp\left(-\exp\left(-\frac{x-\lambda}{\delta}\right)\right)$$

where x is a characteristic parameter of at least one of flaws and microstructural features, and where $\lambda$ and $\delta$ are extreme value statistics location and scale parameters, respectively.

20. The machine of claim 16, wherein criterion for estimating the cracking or debonding of second phase particles is according to the equation $$\sigma_p = 4\phi\beta\alpha^t \mu_m \gamma^*_{max}$$

where $\sigma_p$ is fracture strength of second phase particle, $\gamma^*_{max}$ is the critical maximum local shear strain, below which fatigue crack initiates by debonding, $\alpha$ is the particle aspect ratio, t is a constant between 0 and 1, $\phi$ is an "accommodation factor" equal to the elastic strain in the particle divided by the plastic strain in the matrix and depends on the morphology of particles and the slip system of the matrix, and is equal to 0.393 for spheres and 0.75 for plates in a matrix deforming by multiple slip, $\beta$ is the modulus correction factor to account for elastic inhomogeneity and $\mu_m$ is the shear modulus of the aluminum matrix.

\* \* \* \* \*